T. C. MILES.
Spring-Scales.
No. 209,180. Patented Oct. 22, 1878.
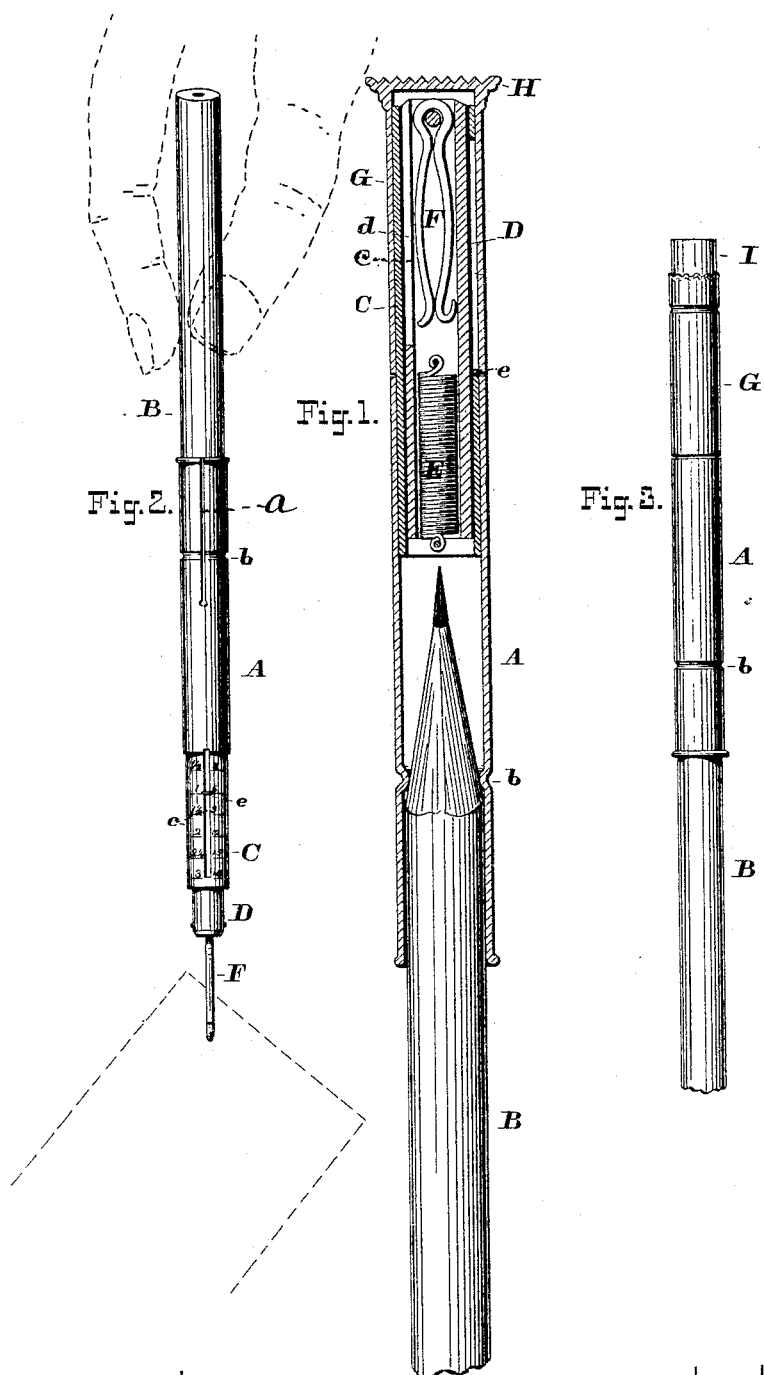
ATTEST:
Arthur C. Fraser.
Walter W. Scott.
INVENTOR:
Thomas C. Miles
Per Burke & Fraser
Attys

UNITED STATES PATENT OFFICE.

THOMAS C. MILES, OF NEW YORK, N. Y.

IMPROVEMENT IN SPRING-SCALES.

Specification forming part of Letters Patent No. 209,180, dated October 22, 1878; application filed March 2, 1878.

*To all whom it may concern:*

Be it known that I, THOMAS C. MILES, of the city, county, and State of New York, have invented a Combined Pencil-Point Protector and Weighing-Scale for Letters and other purposes, of which the following is a specification:

The object of this invention is to provide a point-protector for an ordinary lead-pencil with a convenient and accurate scale for weighing letters, &c., in combination therewith.

In the drawings, Figure 1 is an enlarged longitudinal mid-sectional view, illustrating my combination. Fig. 2 is an elevation of the same with the cover removed as in the act of weighing a letter. Fig. 3 is an elevation of the same with the cover in place.

In all of the views the device is shown as fulfilling the functions of a pencil-point protector.

A represents a tube, in which a pencil, B, of any kind, may fit snugly. This tube may be split, as at *a*, to cause it to enlarge or contract elastically to fit pencils of different sizes, and it may have an obstruction of some kind at *b* to prevent the pencil from entering too far; but these are common in point-protectors, and I do not claim them as my own.

C is a tube which fits inside the tube A, and is attached thereto; or it may, in construction, form a part of the same. This tube C has in it a longitudinal slit, *c*, along one or both margins of which (see Fig. 2) are marks or graduations. Inside of the tube C is another tube, D, which has free longitudinal play therein, and embraces a spring, E, one end of which is fixed to the tube C or A, and the other to the tube D.

F is an elastic clip-hook to nip or hook onto the article to be weighed. This clip hangs loosely on a pin and turns into the cavity of the tube, to which it is attached after the manner of a pocket-knife blade, so that it may be out of the way.

On the tube D, and playing in the slit *c*, is a pointer, *e*, to indicate the weight.

I am aware that letter-scales corresponding in general terms to this described are not new with me, and I do not make any claim thereto; nor do I confine myself to the precise construction here set forth, as it may be varied in some respects without vitiating my combination.

G is a slip-cover, which fits over the tube C. This cover is preferably formed from a tube of the same diameter as the tube A.

The top of the cover may be provided with an engraved seal, H, as in Fig. 1, or receive a rubber eraser, I, as in Fig. 3; or they might be made interchangeable, the seal being made to screw on in the place of the rubber or over it; or, in lieu of the seal or rubber, a blade for erasing and other purposes, or a holder for a pen, might be substituted.

The advantages of this combination are obvious. A point-protector to the ordinary pencil has become almost a necessity, and the eraser combined with it is also a great convenience. I combine with the protector a scale for weighing mail-matter, coins, and all light articles, in such a manner that the proximity and connection tend to enhance the value of both. The slip-cover serves to protect the scale from injury and to bear some valuable auxiliary to the pencil, as before stated.

I claim—

1. The combination of an elastic split tubular pencil-holder and point-protector with a weighing-scale for light articles, in which the pointer is affixed to a slotted sliding tube, into which the clip may be folded, all arranged substantially as herein set forth.

2. The combination of the elastic split tube A, constructed to form a holder and protector for the point of an ordinary pencil, the tube C, slitted and graduated as shown, the tube D, provided with a pointer, *e*, to play in the slot *c*, and slotted as shown, the clip F, hung to the tube D, and arranged to fold into the hollow of the same out of the way, and the spring E, inclosed in the inner tube, all substantially as set forth.

In witness whereof I have hereunto signed my name in the presence of two subscribing witnesses.

THOS. C. MILES.

Witnesses:
 SAM. TRO. SMITH,
 HENRY CONNETT.